United States Patent [19]
Alcock et al.

[11] 3,803,612
[45] Apr. 9, 1974

[54] RADIO INTERFEROMETER

[75] Inventors: Robert Nicholas Alcock; Stephen Joseph Robinson, both of Salfords, near Redhill, England

[73] Assignee: U.S. Philips Corporation, Briarcliff Mannor, N.Y.

[22] Filed: May 31, 1972

[21] Appl. No.: 258,295

[30] Foreign Application Priority Data
June 2, 1971  Great Britain.................... 18543/71

[52] U.S. Cl.............................................. 343/113 R
[51] Int. Cl............................................... G01s 3/48
[58] Field of Search................................. 343/113 R

[56] References Cited
UNITED STATES PATENTS
3,725,855  4/1973  Murphree et al................ 343/113 R
3,406,397  10/1965  Easton et al..................... 343/113 R

*Primary Examiner*—Maynard R. Wilbur
*Assistant Examiner*—Richard E. Berger
*Attorney, Agent, or Firm*—Frank R. Trifari

[57] ABSTRACT

A radio interferometer for measuring vertical angle in which the effect of ground reflections upon the phase angle measured by the interferometer is reduced.

A linear vertical interferometer aerial array has a common aerial element and elements spaced from it by distances $s$, $2s$, $4s$ ... $m\,s$ where $m$ is an integral power of two, the widest spacing $m\,s$ being repeated in a vertically-extending space diversity pattern. This repetition may be effected by additional elements spaced $(16+1)s$, $(16+2)s$, $(16+4)s$ .... from the common element. The phases individually measured from these widest-spaced pairs are manipulated in logic circuits to provide an average phase indication in which the effects of ground reflections tend to be cancelled out.

7 Claims, 5 Drawing Figures

RADIO INTERFEROMETER

This invention relates to interferometer systems and is directed towards an arrangement in which the effect of ground reflections upon the phase angle measured by the interferometer is mitigated.

It is convenient initially to consider the effect of ground reflections upon an aerial element and the effect of the difference in phase between a wave arriving from a distant radiator by a direct path and a wave arriving from that distant radiator and reflected from the ground in front of the aerial element.

The basic considerations involved are conveniently set out in "Microwave Engineering" by A.F. Harvey, Academic Press, 1963 (hereinafter referred to as "Harvey") at page 1,066, see particularly FIG. 23.2. As explained there, the path difference between the direct and reflected waves is given by the expression $$2h \sin \theta \quad \text{(i)}$$

where $h$ is the height of the aerial element and $\theta$ the angle of incidence of the reflected wave. The phase difference $\beta$ between the two waves can be expressed by the relationship $$\beta = (4\pi h \sin \theta)/\lambda \quad \text{(ii)}$$

If we now write $$n = (4h \sin \theta)/\lambda \quad \text{(iii)}$$

as explained in Harvey at the foot of the page referred to there will be maxima for all odd integral values of $n$ and minima for all even integral values. In other words for odd integral values of $n$ the direct and reflected wave will add in phase at the aerial element whereas for even integral values of $n$ they will add in antiphase and a minimum will be observed.

It is apparent from consideration of these expressions that $n$ may vary according to $h$ and according to $\theta$ where $\theta$ is constant, as would be the case in a point-to-point communication link, then it would be expected that $h$ could be so selected as to make $n$ an odd integer and so attain a maximum. However, as pointed out by Bateman in Proc. I.R.E. September 1946 pages 662 and 663 (hereinafter referred to as "Bateman"), tropospheric effects produce changes in the path-length difference between the direct and the reflected wave: in order to minimise these effects Bateman proposes the theory of "half-lobe spacing," that is to say, two vertically-spaced aerial elements, to achieve "complementary diversity reception." It is, however, apparent that this technique could only applied to a situation where the angle $\theta$ is fixed and that in cases where the angle $\theta$ may lie anywhere within an appreciable range then $n$ will vary with $\theta$ and the systems outlined by Bateman and Harvey would appear to afford no improvement in the elimination of ground-reflection errors.

As a result of considerable investigations into the design of vertical interferometers, that is to say aerial systems arranged so as to measure vertical angle, the applicants have now found that the principles formulated by Harvey and Bateman can be used as a basis to produce a space diversity interferometer in which the phase difference caused by ground reflections can be considerably reduced, thus enabling more accurate determination of the angle $\theta$.

Prior art phase measurement using hybrid junctions, digital derivation and processing is described, for example, in the British Patent No. 1,191,831.

According to the present invention, a radio-frequency space diversity vertical interferometer aerial arrangement is in the form of a vertically extending linear array of aerial elements and includes four equally spaced pairs of aerial elements of which the spacing between one pair of elements is the same as the spacing between the other pair of elements. Suitably, the arrey comprises two sets of aerial elements having a mutual spacing of $s$. The elements in each set are arranged in a geometric progression. The array may comprise a further element spaced by an integral power of two from the lower one of the said two sets of elements.

Also according to the invention, a vertical interferometer system comprises an aerial array as defined above, phase-discriminator means to derive from each equally spaced pair of elements a measure of vertical angle of a radio source and means to derive an average from the said measurements. The phase-discriminator means may be of any suitable nature, for example may incorporate four-port hybrid junctions or tapped transmission line devices. Suitably, the measurement is derived in digital form and where this is the case the averaging means may operate to add together in binary form the digitised measurements from the discriminators and to derive the average measurement by discarding or ignoring two or more lower-order digits of the binary sum.

An embodiment of the invention will now be described by way of example with reference to the accompanying diagrammatic drawings in which.

Figure 1:
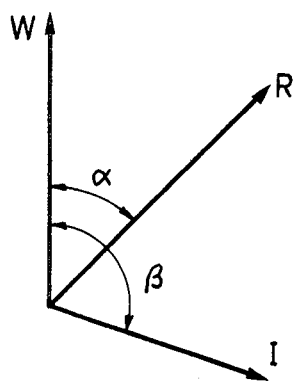
FIG. 1 illustrates phase relationships between direct and reflected waves.

Referring now to FIG. 1 let us consider the effect of the arrival at an aerial element of a direct wave W and an indirect wave I which has been reflected from the ground. The indirect wave I will exhibit a phase difference $\beta$, see equation (ii) above, with respect to the direct wave W and these two waves with a phase difference $\beta$ will combine to form a resultant wave R which is at an angle $\alpha$ with respect to the direct wave W. In other words we can see that the effect of the indirect wave I is to produce a resultant R which exhibits a phase error $\alpha$ with respect to the true phase of the direct wave W. Inspection of FIG. 1 will readily show that whatever the angle $\beta$ of the indirect wave, the angle $\alpha$ will vary between +90° and −90° with respect to W; the magnitude of the vector I is of course never greater than that of the vector W since reflection will be accompanied to a greater or lesser degree by attenuation, dependent upon the nature of the reflecting ground surface.

Let us now consider the effect upon the angle $\beta$ of $h$ and of $\theta$, both of which at this juncture we may regard as variables. Where, as at microwave frequencies will almost invariably be the case, $h$ is appreciably larger than $\lambda$ then we can see that as $\sin \theta$ increases the vector I will rotate clockwise from 0° through 180°, where the vectors W and I are in antiphase, back again to 360°, that is to say, 0°: thus we may construct a graph showing the variation of $\beta$ to a base of sin $\theta$ and this graph will exhibit cyclic variations between +90° and −90° for any given fixed value of height $h$.

Similarly, if we assume a fixed angle $\theta$ and consider the effect of variations in height $h$, we will find that as $h$ is increased $\beta$ will similarly exhibit cyclic variations from 0° through 180° to 360° so that we may construct a similar graph showing the variation of $\alpha$ to a base $h$ for a constant value of $\theta$ and, again, this will exhibit cyclic variations between +90° and −90° in a similar manner to that for the graph discussed in the preceding paragraph.

A somewhat more detailed explanation of this phenomenon is given in a communication by D.K. Barton in Proc. IEEE, 1965 pages 543 and 544 (hereinafter referred to as "Barton").

As mentioned above, the indirect wave I, FIG. 1, will suffer attenuation in its reflection from the ground surface; further, some degree of what is known as "polar diagram protection", that is to say reduction in the strength of a received signal when that signal is not arriving from a source along the beam axis of a directional receiving aerial, can also be arranged as shown in Barton's FIG. 1. This attenuation at the receiver aerials of the indirect wave will reduce the magnitude of the vector I in FIG. 1 and hence also will reduce the angular excursions of the resultant vector R.

In a simple interferometer comprising two vertically spaced aerial elements the process of measuring the vertical angle of a source of radiation is based upon measuring the phase of the incident signal at one aerial element relative to the phase of the incident signal at the other aerial element, so that the presence of ground reflections and the resulting phase error introduced at each of the elements will distort this phase measurement by introducing an error into it. The present invention is based upon an extension of the arguments developed above and applies the principle of space diversity not to a single aerial but to a pair of aeriel elements which form an interferometer.

Figure 2:
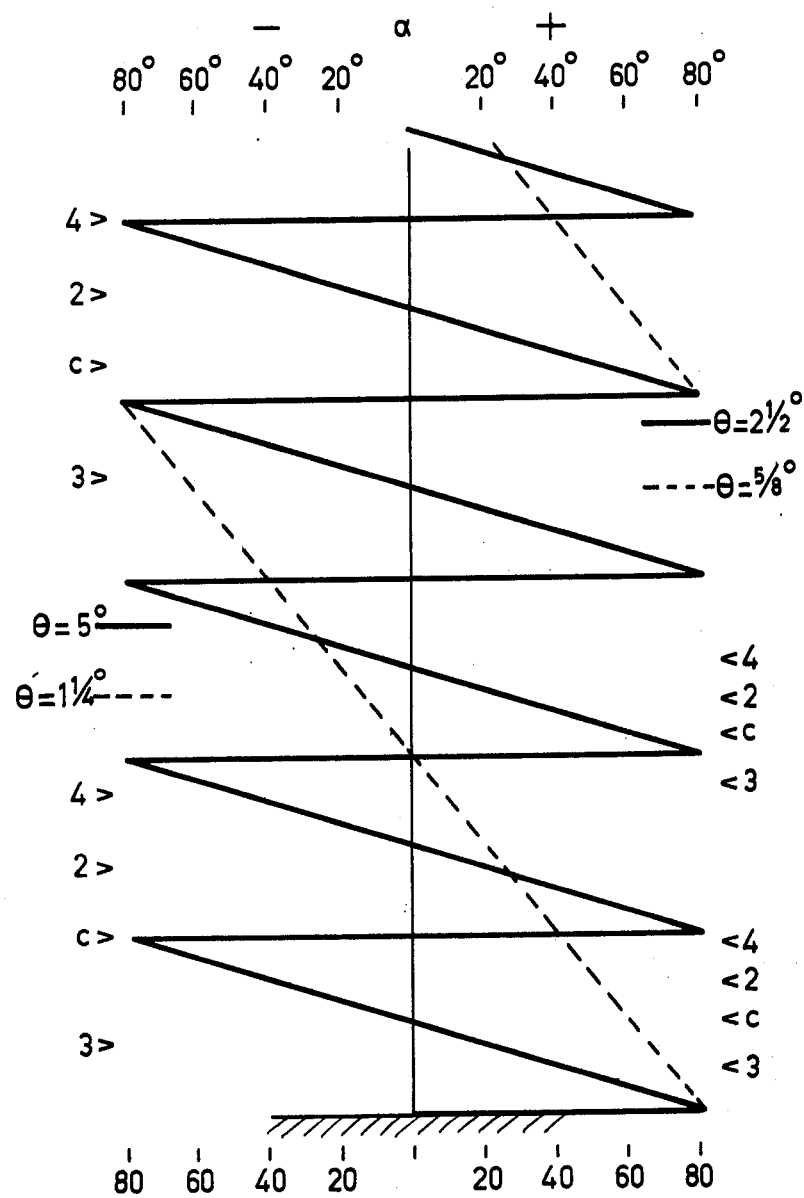
FIG. 2 is a phase-height graph.

With these considerations in mind it is possible to draw, for any given angle of incident radiation $\theta$, a phase-height graph showing how the error phase angle $\alpha$ of the resultant wave R varies with height and this is illustrated in the continuous-line graph of FIG. 2 where the angle $\alpha$ is plotted horizontally and height above ground is plotted vertically. In FIG. 2 and in the following arguments based upon this Figure it is convenient in order to avoid undue complications to make certain basic assumptions. These are: that the angle $\alpha$ varies between +80° and −80°; that for the purpose of the discussion the interferometer aerial array comprises four interferometer pairs with a spacing of 16$d$ between the two elements of each interferometer pair with a dimension $d$ of about 65 m.m.; that the lower element "3" of the lowest pair is spaced about 2$d$ from the ground; and that the other interferometer pairs are disposed vertically with the lower element "C" of the next lowest pair spaced 3$d$ above the lower "3" element, with the lower element "2" of the next lower pair spaced 2$d$ above the lower "C" element and with the lower element "4" of the highest pair spaced 4$d$ above the lower "C" element. It will be appreciated later that these dimension and dispositions correspond to the experimental embodiment described with reference to FIGS. 3, 4 and 5 of the drawings.

It is emphasised that the "sawtooth" patterns of FIG. 2 are merely convenient approximations which are sufficient to illustrate the general principle of averaging and represent a case where the reflection coefficient approaches unity and polar diagram protection is substantially ignored, so that the error phases $\alpha$ are relatively large. Further, in the following measurements of phase from the graph, as at the limits of ±80° there is a discontinuity, at those points the phase is assumed to be zero which is midway between the limits of the discontinuity.

Referring now to the continuous-line graph of FIG. 2 and ignoring for the time being the matter appearing at the right-hand side of the graph there is illustrated at the left of the graph a multiple interferometer aerial system having the parameters assumed above: a short calculation will show that on this scale the angle $\theta$ is approximately 5°. We can now take each pair of elements and estimate the error phase at each element from the graph and this is shown in the first set of figures tabulated in Table I, for the upper and lower element of each pair: having done this we can then find the difference between the error phases of the two elements and from the four phase-differences thus obtained we can arrive at an average error phase-difference. These steps are set out in the first set of figures in Table I and it can be seen that the average phase-difference error is less in magnitude than any of the individual phase-difference errors.

Let us now raise the whole aerial system by a distance equivalent to $d$ and let us repeat the process: this is set out in the second set of figures in the Table I and in this particular example again the average error is less in magnitude than any of the individual errors.

Again, by way of further example, consider the whole aerial system raised by a further distance $d$ thus making it higher by 2$d$ than the original position shown at the left hand side of FIG. 2, and again let us derive the appropriate estimates of phase: these figures are set out in the third part of Table I and, again, the average error is less than any of the individual errors.

Let us now alter the angle $\theta$. Now, if we remember that we are dealing with small angles in the range where $\theta$ equals sin $\theta$ then the phase-difference between the upper and lower elements of any pair can be expressed as being proportional to $h\cdot\theta$, see expression (ii) above. We may therefore adopt the convenient strategem, to avoid having to re-draw the graph of FIG. 2 for a different angle, of scaling down the dimension of the aerial array so as to have the same effect as the scaling up, that is to say increasing the vertical dimension of, the wave pattern of the graph itself. We may thus re-draw our aerial array so that it is only half as high as the aerial array for $\theta = 5°$ shown on the left-hand side of the graph of FIG. 2 and we may label this re-dimensioned aerial array as $\theta = 2\frac{1}{2}°$: this re-dimensioned array is shown at the right-hand side of FIG. 2.

Referring still to the continuous line pattern of FIG. 2 we may now repeat the process of deriving phase error differences for each element of each pair and then determining the average error over the four pairs; for $\theta = 2\frac{1}{2}°$ this is shown in the first set of figures of Table 2. Again, the magnitude of the average error is less than any of the individual errors.

Consider now the wave pattern drawn in broken lines on FIGS. 2: taking the aerial array dimensions shown at the left-hand side of the Figure this illustrates a pattern pertaining to an angle $\theta$ of 1¼°. The appropriate error phases derived from this pattern are set out in the second part of Table II.

Finally, consider an angle $\theta$ of 5/8°: the appropriate wave pattern here again is that shown in the broken-line graph on FIG. 2 and had been dimensioned so as to be read in conjunction with the aerial array illustrated at the right hand side of the Figure, and, as will be appreciated, applicable both to $\theta = 2\frac{1}{2}°$ and $\theta = 5/8°$. The appropriate angles then derived are set out in part 3 of Table II and it will be observed that not only is the average angle now of considerable magnitude but that all the individual errors are the same; the reason for this is apparent from the graph where it can be seen that the overall height of the aerial array is well within the range of height through which the broken-line wave pattern changes slowly from one limit to the other.

As has already been mentioned FIG. 2 is only a very simplified illustration of the manner in which phase error varies with height and each of the patterns is shown as being composed only of straight lines, partly to simplify the drawing and partly to simplify the derivation of the error phases set out in Tables I and II. In fact, as will be apparent from Barton, abrupt changes of phase at the limits of maximum error phase will only occur if the indirect wave I is of the same magnitude as the direct wave W in FIG. 2 and in other circumstances the wave pattern will tend to follow a series of curves becoming more curved as the attenuation of the indirect wave is increased and hence also as the limit of the error phase $\alpha$ decreases. The wave pattern will however retain the characteristic of a discontinuity, that is to say an instantaneous phase change, from one limit to the opposite limit and a continuous phase change back to the first limit as height increases.

Consideration of FIG. 2 and of the measurements tabulated leads to an important general rule. Provided that the angle $\theta$ of incident radiation is large enough to establish over the height of the aerial system a sufficient number of repetitions, or "cycles" as it were, of the basic wave pattern then an interferometer system comprising a plurality of interferometer pairs in a space diversity arrangement will yield an average measurement that is significantly more accurate than that made from a single interferometer. In this connection it is interesting to compare techniques of the present invention with previously held theories: see for example Barton who states, page 544, that "the effect of multipath error is seen to restrict greatly the usefulness of vertical interferometers:" see also Bateman at page 663 column 2, lines 3 to 5, who although merely concerned with fading and not with the measurement of phase, nevertheless concludes that "this space antenna method is strictly applicable only for point-to-point circuits," that is to say situations where $\theta$ is constant and known.

As can be understood from Table I, the results obtained are dependent upon the height above ground of the whole array and as will be understood from FIG. 2 this effect comes more pronounced as the angle $\theta$ decreases and hence as the number of repetitions of the basic wave pattern over the height of the aerial array also decreases.

TABLE I

| | | Error Phases (degrees) | | |
|---|---|---|---|---|
| | Aerial Pair | Upper (a) | Lower (b) | Difference (a-b) |
| Aerial System as drawn $\theta + 5°$ | 4 | 0 | −48 | +48 |
| | 2 | −16 | +16 | −32 |
| | C | +48 | 0 | +48 |
| | 3 | −16 | +16 | −32 |
| Average | | | | +8 |
| Aerial System raised by $d$ $\theta = 5°$ | 4 | +48 | 0 | +48 |
| | 2 | −48 | −16 | −32 |
| | C | +16 | +48 | −32 |
| | 3 | −48 | −16 | −32 |
| Average | | | | −12 |
| Aerial System raised by $2d$ $\theta = 5$, | 4 | +16 | +48 | −32 |
| | 2 | 0 | −48 | +48 |
| | C | −16 | +16 | −32 |
| | 3 | 0 | −48 | +48 |
| Average | | | | +8 |

TABLE II

| | | Error Phases (degrees) | | |
|---|---|---|---|---|
| | Aerial 4 Pair | Upper (a) | Lower (b) | Difference (a-b) |
| $\theta = 2\frac{1}{2}°$ | 4 | 0 | −64 | +64 |
| | 2 | +32 | −32 | +64 |
| | C | +64 | 0 | +64 |
| | 3 | −48 | +48 | −96 |
| Average | | | | +24 |
| $\theta = 1\frac{1}{4}°$ | 4 | +40 | +8 | +32 |
| | 2 | +56 | +24 | +32 |
| | C | +72 | +40 | +32 |
| | 3 | −64 | +64 | +128 |
| Average | | | | −8 |
| $\theta = 5/8°$ | 4 | −20 | +44 | −64 |
| | 2 | −12 | +52 | −64 |
| | C | −4 | +60 | −64 |
| | 3 | +8 | +72 | −64 |
| Average | | | | −64 |

In the embodiment about to be described, the invention was applied to the elevation unit, that is to say a vertically extending interferometer array designed to measure vertical angles, of a radio navigation system.

The system was designed to operate in the 5.0 GHz band which is allocated to navigational aids and is about the highest frequency at which the coverage can be achieved in heavy precipitation conditions. This frequency range is also one of those favoured for the new ICAO guidance system.

If a series of interferometer pairs is set up with spacing in geometric progression with a ratio of two, the ambiguities in the widest spaced interferometer can be resolved over the unambiguous field of view of the narrowest spaced interferometer. In principle this ambiguity resolution is possible with phase difference errors between interferometers of up to a theoretical limit of 90° but in practice it is wise to allow for digitisation and instrumental phase errors and about 50° will be available to give tolerance to indirect multi-path signals. Other aerial element spacing patterns are possible but this one is particularly well suited to binary-code digital processing.

Figure 3:
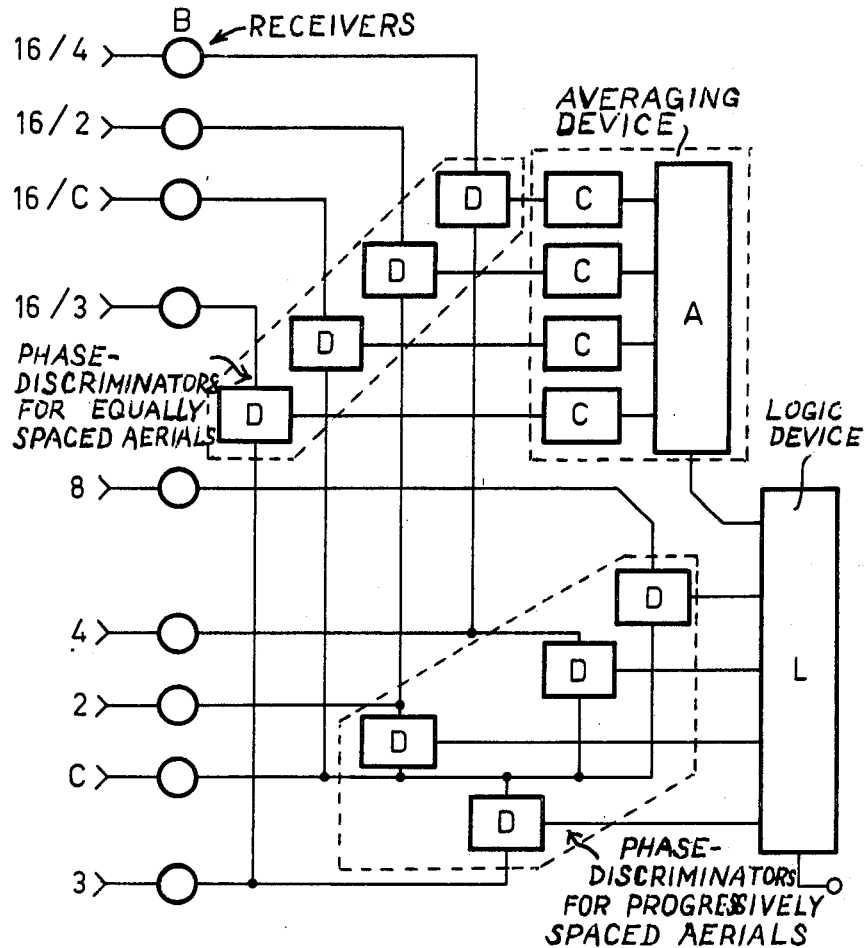
FIG. 3 is a block diagram of a complete system.

Referring now to the system illustrated in block diagram form in FIG. 3 there is shown at the left hand side of the Figure a vertical array of aerial elements which for convenience are referred to indicate their mutual spacings. The four widest-spaced pairs of elements are formed between elements 16/3 and 3, elements 16/C and C, elements 16/2 and 2 and elements 16/4 and 4; each of these pairs had a spacing of 16d where $d = 6.5$ cm; the aerial array is placed as close as practicable to the ground surface, the spacing between element 3 and the ground being, in one experimental arrangement, about 12 cm. The other pairs are formed between 2, 3, 4, 8 and the common aerial C with respective spacings $2d$, $3d$, $4d$ and $8d$. The interferometer spacings relative to the common aerial C are therefore in the ratio 3 : 2 : 4 : 8 : 16, the $16d$ spacing however being repeated three times in a space diversity arrangement based upon the principles previously discussed.

The microwave signal at each aerial passes to a superhetrodyne receiver B, all the receivers being supplied from a common local-oscillator source not shown. The phase difference between signals from a pair of receivers is measured at the intermediate frequency, suitably 40 MHz, in a discriminator D and the phase is derived in a digital code, is amplified to logic level and is processed in a logic network. The phase measured on the lowest set of aerial pairs spaced $2d$, $3d$, $4d$ and $8d$ with respect to common aerial C is digitised to 45° using four detectors (FIG.4) on each discriminator and appears as a four-bit Johnson Code. The phase measured on the upper set of four aerial pairs with $16d$ spacing is digitised to 22½°, and appears as an eight-bit Johnson Code. The phase discriminators of this type are known in the art and have been described, for example, in the aforementioned British Pat. No. 1,191,831.

Phases derived from the four widest, equally spaced pairs are each converted into a four bit binary code in respective converters C and are averaged by being divided by four and added together, with an appropriated scale shift, in an adder A: this of course is exactly the process of deriving an average angle as has already been discussed in simple terms with reference to FIG. 2. Phase digits from all the discriminators pass to the ambiguity resolving logic L which provides a 10 bit simultaneous binary measure of elevation angle.

In principle, phase ambiguity in an aerial pair with spacing $2d$ may be resolved by reference to a pair with a spacing of either $d$ or $3d$. In this embodiment the spacing $3d$ was chosen since the physical size of the aerials precluded the use of a spacing $d$.

In the preceding description reference has been made to phase measurement using hybrid junctions, followed by digital derivation and processing; however, another arrangement which has been found to be satisfactory is to use a transmission-line phase-measurement technique, followed of course by digital derivation and processing arrangements as already referred to.

The principles of phase measurement using a transmission line are, as is well known, based upon the proposition that if sinusoidal signals at the same frequency are fed into the opposite ends of a matched delay line, a standing wave pattern will be set up in the line: suitable comparison of the voltage amplitudes at appropriate points along the line yields information of the relative phase of the two signals. Thus for example the use of four tapping points in a line of length 3 λ/8, the points being space λ/8 apart, can determine the phase angle to within 45°. The principles of course are very similar to those in which the standing wave pattern in a transmission line is used to measure impedance with the difference that the signal at each tapping point is applied to a square-law detector, the outputs at selected points being then compared in simple subtracting circuits 5 to derive signals of which the signs that is to say the polarities or "directions" indicate in binary code the measured angle.

Figure 4:
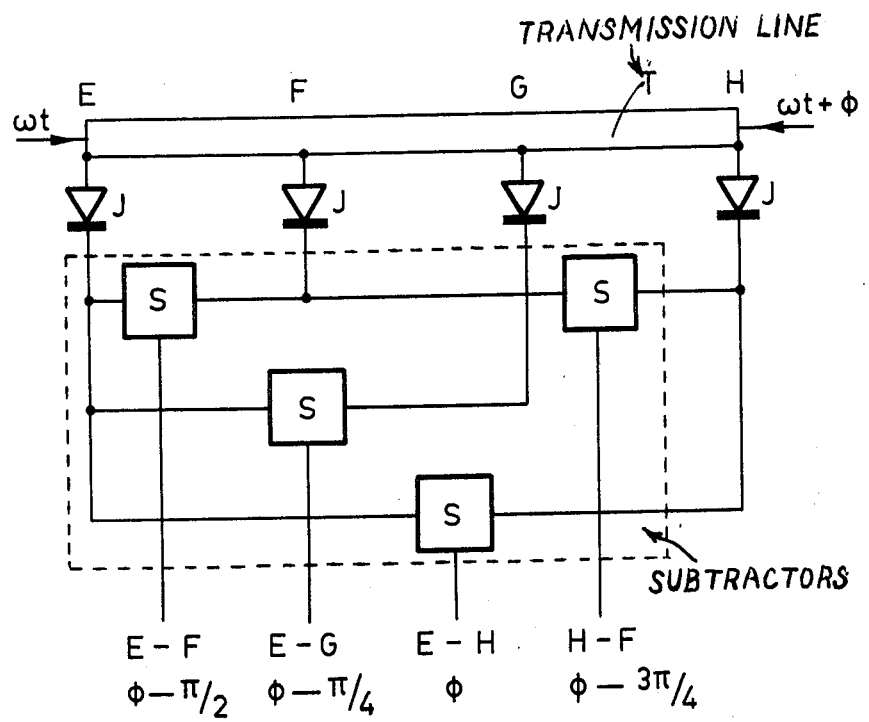
FIG. 4 illustrates a transmission-line phase-discriminator.

This technique of digitizing phase within intervals $\pi/4$ (that is, 45°) is illustrated in FIG. 4 where we have a delay line T, which is merely a length of ordinary transmission line, which is 3λ/8 long and has for equally spaced tapping points E, F, G and H spaced apart by a distance λ/8. Each tapping point feeds a square-law detector J and the outputs from these detectors are compared in subtracting circuits S. If we now apply to the two ends of the lines sinusoidal signals of the same amplitude and frequency but having the respective parameters $\cos \omega t$ and $\cos(\omega t + \phi)$, then the difference between the square-law detected outputs at points E and H will yield a signal of which the sign, that is to say, the direction or polarity, is the same as that of $\sin \phi$. Similarly, we can derive from tapping points E and F a signal of which the sign corresponds to that of $\sin(\phi - \pi/2)$: similarly again, we can derive from E and G an indication of $\sin(\phi - \pi/4)$ and from H and F an indication of $\sin(\phi - 3\pi/4)$. These angles are indicated on FIG. 4.

Figure 5:
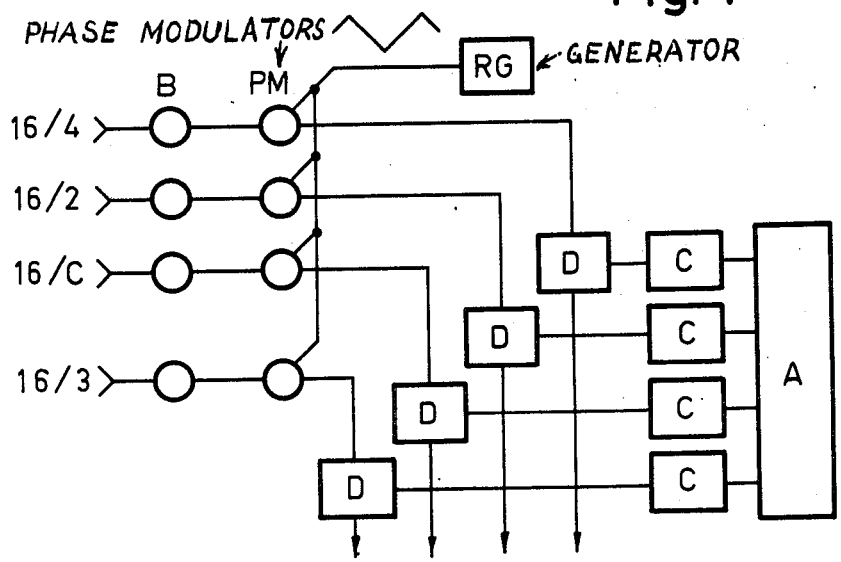
FIG. 5 illustrates a modification.

Referring now to FIG. 5 this illustrates a refinement of the arrangement illustrated in the upper part of FIG. 3. In FIG. 5, the receivers B do not feed directly into the discriminators D but the output from each one is applied to a phase modulator PM. Each phase modulator is in the form of a simple resistor-capacitor phase shifter where the resistor is a voltage-dependent resistor. A ramp generator RG provides a 500 Hz signal of triangular wave-form as illustrated in FIG. 5 and this is applied to the voltage-dependent resistors in each of the phase modulators. Thus, the phase of the signal entering the phase modulator from the receiver B is modulated by applying this triangular wave: the phase excursion is equal to the digital interval of the phase discriminators, that is 22½°. The measured phase thus varies over the digital interval and when integrated over a number of pulses the digital interval is averaged out: by means of this "phase wobble" technique the phase can be measured more accurately then the digital interval of 22½°.

The outputs from the phase modulators PM are then applied to discriminators D and from thence to converters C in the same manner as has been described with reference to FIG. 3.

In the arrangements described above, nine aerials combined as eight pairs are used to generate a 10-bit binary word representing the elevation angle. The field of view is $\sin^{-1}(\lambda/d)$ where $d$ is the spacing of the closest pair; this provides a field of view of 65° which is considered adequate for operating over the range from 0° to 45° in elevation.

Superheterodyne receivers B were used to obtain adequate sensitivity and selectivity: as the phase comparison measurement is made at the intermediate frequency, the local oscillator signal distribution must be phase-coherent.

In the experimental embodiment it was found that two aircraft could be separated in elevation when the angle between them from the ground equipment was greater than ($0.1°$ sec $\theta$) where $\theta$ is the aircraft elevation angle.

What is claimed is:

1. A radio frequency vertical interferometer system comprising a vertically extending linear aerial array including a lower array portion with aerials spaced from each other in a predetermined progression, an upper array portion with aerials spaced in a similar progression to form with corresponding aerials in the lower array portion a plurality of equally spaced interferometer aerial pairs, phase discriminator means connected to each aerial pair for deriving measurements of vertical angles of radio signals incident on respective aerial pairs, and means for deriving an average from said measurements to reduce phase error introduced by signal components reflected from ground.

2. A system as claimed in claim 1, wherein said predetermined progression of spacings between aerials in each array portion is a geometric progression with a ratio of an even integer of a unit spacing.

3. A system according to claim 2 wherein each array portion includes a lowermost aerial spaced from a common aerial about an odd integer of a unit spacing.

4. A system according to claim 3 further including additional phase discriminator means connected to respective narrow aerial pairs formed in said lower array portion with said common aerial to provide said equally together with the averaged measure from spaced aerial pairs, an aperture sampling angle measuring device having reduced errors due to ground reflections.

5. A system according to claim 4, further including ambiguity resolving means connected to said additional phase discriminator means and to said average deriving means to resolve the ambiguity of the widest spaced aerial pairs over the unambiguous measurements of narrow aerial pairs.

6. A system as claimed in claim 4 wherein the phase-discriminator means, said average deriving means and said ambiguity resolving means are operative to provide a phase measurement output in binary digital form.

7. A system as claimed in claim 6 wherein the averaging means is operable to add together the binary digital outputs from the discriminators and to derive the average measurement by discarding or ignoring two or more lower-order digits of the binary digital sum.

* * * * *